United States Patent [19]

Lombardi et al.

[11] Patent Number: 5,096,582

[45] Date of Patent: Mar. 17, 1992

[54] TANGENTIAL FLOW FILTRATION APPARATUS

[75] Inventors: Andrew A. Lombardi, Methuen; James H. Edwards, Winchester, both of Mass.

[73] Assignee: Millipore Corporation, Bedford, Mass.

[21] Appl. No.: 587,898

[22] Filed: Sep. 25, 1990

[51] Int. Cl.⁵ ............................................ B65D 41/16
[52] U.S. Cl. ......................... 210/321.6; 210/321.75; 210/321.84; 210/456; 210/483
[58] Field of Search ................ 210/321.84, 321.75, 210/295, 304, 500.21, 314, 321.72, 321.69, 650, 651, 321.64, 321.6, 483, 456

[56] References Cited

U.S. PATENT DOCUMENTS

| | | | |
|---|---|---|---|
| 4,212,742 | 7/1980 | Solomon et al. | 210/456 |
| 4,228,015 | 10/1980 | De Vries et al. | 210/321.75 |
| 4,261,834 | 4/1981 | deWinter | 210/651 |
| 4,310,416 | 6/1982 | Tanaka et al. | 210/500.21 |
| 4,323,455 | 4/1982 | Tanaka et al. | 210/321.75 |
| 4,624,784 | 11/1986 | Lefebvre | 210/321.75 |

Primary Examiner—Robert A. Dawson
Assistant Examiner—Ana M. Fortuna
Attorney, Agent, or Firm—Andrew T. Karnakis; Paul J. Cook

[57] ABSTRACT

A tangential flow filtration apparatus which utilizes a single manifold to introduce liquid to be filtered into the apparatus and to remove a filtrate stream and a retentate stream from the apparatus is provided. A plurality of filtration members are stacked in a vertical arrangement between the manifold and a plate. Holes and sealing means are provided within the filtration member to effect vertical flow of the filtrate, retentate and incoming liquid through the stack while preventing admixture of the filtrate with the retentate or the incoming liquid.

4 Claims, 4 Drawing Sheets

TANGENTIAL FLOW FILTRATION APPARATUS

BACKGROUND OF THE INVENTION

This invention relates to an apparatus for filtering a liquid wherein filtration is effected by tangential flow of the liquid across a filter surface. More particularly, this invention relates to such a filtration apparatus wherein a plurality of filters are arranged in a stacked relationship and secured to a manifold which permits introduction of the liquid and removal of rentate and filtrate.

Prior to the present invention, liquids, primarily aqueous liquids have been filtered by tangential flow devices wherein a plurality of filters are stacked between two manifolds, one at the bottom of the stack and one at the top of the stack. The filters are separated by appropriate screens and liquid impervious layers to permit liquid flow, as well as filtrate and retentate flow into and from the stack. In addition, flow holes are provided through the layers within the stack. The holes are sealed appropriately to prevent admixture of filtrate with incoming liquid or retentate. The manifolds are designed so that filtrate is removed from both the top and bottom manifolds while incoming liquid is introduced into one manifold and retentate is removed from the second manifold. This manifold arrangement necessitates fittings to both manifolds in order to supply and remove liquid to and from the stacks. This is undesirable since additional manipulative steps for removing and connecting the fittings are required when it is desirable to replace the filtration elements forming the stack. In addition, the use of two manifolds to remove filtrate from the stack undesirably increases the filtrate volume retained within the stack. Furthermore, the requirement of two manifolds is undesirably expensive.

Accordingly, it would be desirable to provide a tangential flow filtration apparatus which utilizes only one manifold and which prevents admixture of liquid to be filtered, filtrate and retentate.

SUMMARY OF THE INVENTION

In accordance with this invention, a tangential flow filtration device is provided which utilizes at least one filtration element and a single manifold. Each filtration element includes a filter layer and two spacer layers, each in contact with one surface of the filter layer. A liquid impermeable layer is positioned to seal adjacent spacer layers from each other. The filtration elements are arranged in a vertical stack and are provided with liquid inlet ports, filtrate outlet ports and retentate outlet ports which are sealed from each other to prevent admixture of filtrate with incoming liquid or retentate. The manifold includes a liquid inlet connected to the liquid inlet ports, a filtrate outlet connected to the filtrate outlet ports and retentate outlet connected to the retentate outlet ports. The top surface of the vertical stack of filtration elements is sealed to provide inlet liquid flow, filtrate flow and retentate flow to the appropriate ports within the stack.

DESCRIPTION OF SPECIFIC EMBODIMENTS

Figure 1:
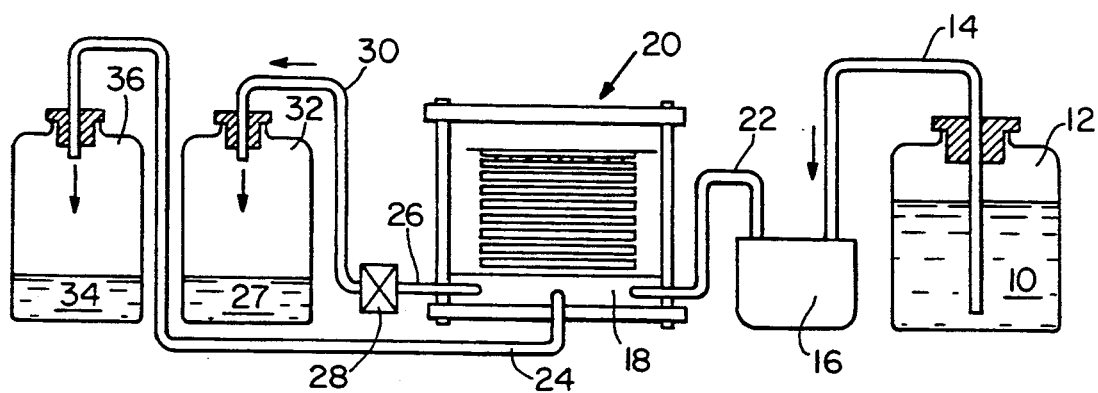
FIG. 1 illustrates the use of the present invention.

This invention is based upon the design of a manifold which includes a liquid feed inlet, a filtrate outlet and a retentate outlet. This manifold design contrasts with the manifold system of the prior art which utilized two manifolds. The manifold is used in conjunction with one or a plurality of filtration elements vertically positioned relative to each other. Liquid passageways and sealing means are provided to effect tangential flow of incoming liquid across a filtration membrane to form a filtrate stream and retentate stream. The sealing means prevents admixture of filtrate with incoming liquid or retentate. The manifold permits the use of a single liquid feed inlet, a single retentate outlet and a single filtrate outlet.

The filtration element comprises a filter layer, two spacer layers each of which contacts a surface of the filter layer and a liquid impermeable layer which contacts one of the spacer layers. The filter layer effects filtration of the incoming liquid. The spacer layers permit improved liquid flow through the filtration element. The liquid impervious layer provides sealing of liquid within a filtration element from the liquid within the next adjacent filtration element within the vertical stack of filtration element.

A plurality of holes are provided at opposite ends of the filtration elements to permit flow of incoming liquid, rententate and filtrate in a vertical direction within the vertical stack of filtration elements.

The holes which accomodate filtrate flow are sealed from liquid within the spacer positioned on the retentate surface of the filter layer. The holes which accomodate the retentate are sealed from liquid within the spacer positioned on the filtrate surface of the filter layer. The incoming liquid passes vertically in one direction through the stack of filtration elements, tangentially across the retentate surface of the filter layer within each filtraion element to pass vertically in a direction opposite the flow of incoming liquid to thereby form the retentate stream. The filtrate stream is formed by the liquid passing through the filter layer. The filtrate passes vertically through the stack of filtration elements and at opposite ends of the filtration elements. The filtrate streams are collected at the manifold positioned at one end of the stack and exit the manifold as a single stream.

The filter layer can comprise any conventional filtration means including a microporous membrane or an ultrafiltration membrane. The filter layer can comprise one of a plurality of filtration means such as a plurality of ultrafiltration membranes as disclosed in U.S. Pat. No. 4,261,834 which is incorporated herein by reference.

The spacer element can comprise a coarse or fine mesh layer formed from woven polymeric fibers such as polyester as is conventional in the art.

The liquid impervious layer comprises a solid polymeric sheet such as polyethylene.

The retentate holes and filtrate holes are sealed from each other such as with epoxy or polyethylene.

Referring to the drawings, FIG. 1 shows a filtration system utilizing the present invention. Liquid 10 to be filtered is housed within container 12 and is removed through conduit 14 by pump 16 and into the manifold 18 of filtration apparatus 20 by conduit 22. The liquid 10 is filtered within filtration apparatus 20 and filtrate is removed through conduit 24 while retentate is removed through conduit 26. Retantate 27 passes through restriction valve 28 and conduit 30 into container 32. Filtrate 34 is directed into container 36.

Figure 2:
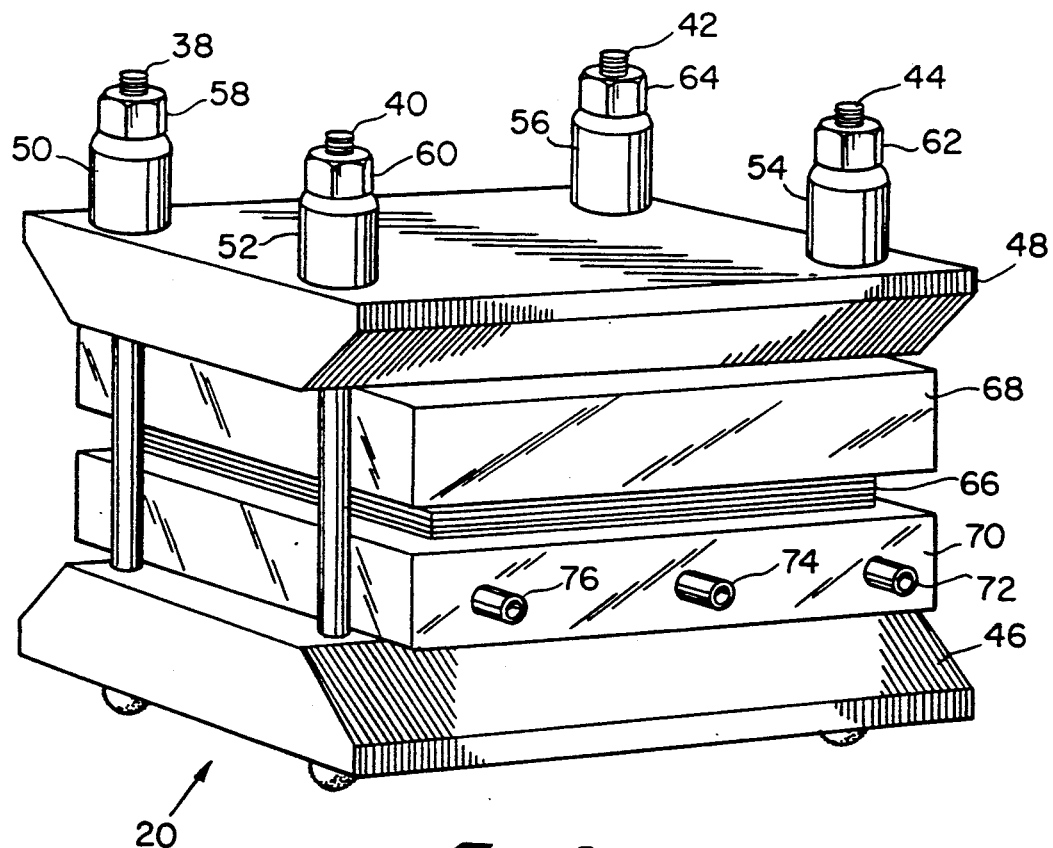
FIG. 2 is a perspective view of an assembled apparatus of this invention.

Referring to FIG. 2, the filtrate apparatus 20 is shown. Tie rod bolts 38, 40, 42 and 44 extend vertically from bottom frame 46 to top frame 48 and are maintained in place by spacers 50, 52, 54 and 56 and bolts 58, 60, 62 and 64. One or a plurality of filtration elements 66 are positioned in vertical relationship between plate 68 and manifold 70. The manifold 70 is provided with a liquid inlet 72, a filtrate outlet 74 and a retentate outlet 76.

Figure 3:
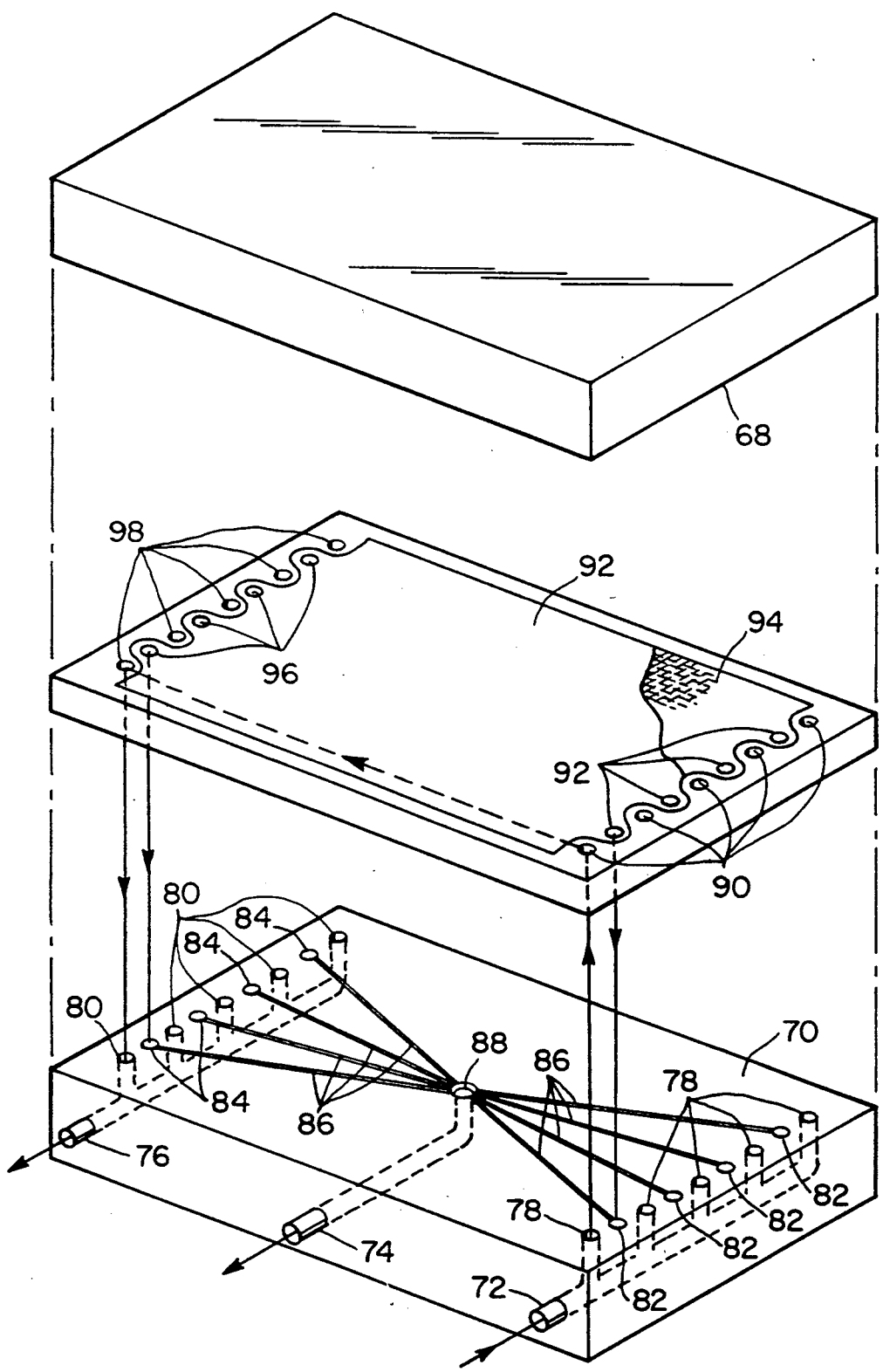
FIG. 3 is an exploded view of the manifold system of this invention.

Referring to FIG. 3, the manifold 70 of this invention is described. A filtration element 66 is positioned between manifold 70 and plate 68. Manifold 70 is provided with liquid inlet 72, filtrate outlet 74 and retentate outlet 76. The manifold 70 includes a plurality of liquid inlet ports 78 and a plurality of retentate outlet ports 80. One set of filtrate outlet ports 82 is provided on one end of the manifold 70 while a second set of filtrate outlet ports 84 is provided on the opposite end of manifold 70. The filtrate outlet ports 82 are connected to filtrate outlet 74 by filtrate outlet paths 86 and centrally located port 88. The filtrate outlet paths can be connected to filtrate outlet 74 by a convenient means such as a centrally located path which, in turn, communicates with filtrate outlet 74. The paths 86 are of a size which permits filtrate to flow therethrough while avoiding sagging of the filter layer into the path 86, typically about 0.6 to 0.12 inch wide. The filtration member 66 includes holes 90 which communicate with liquid inlet ports 78 and holes 92 which communicate with filtrate outlet ports 82. As seen in FIG. 3, the filtrate side 92 of the filter layer having mesh spacer 94 in contact therewith is exposed. The filtration member 66 also is provided with holes 96 which communicate with retentate outlet ports 80. The plate 68 serves as a seal for the top surface of the filtration member 66.

Figure 4:
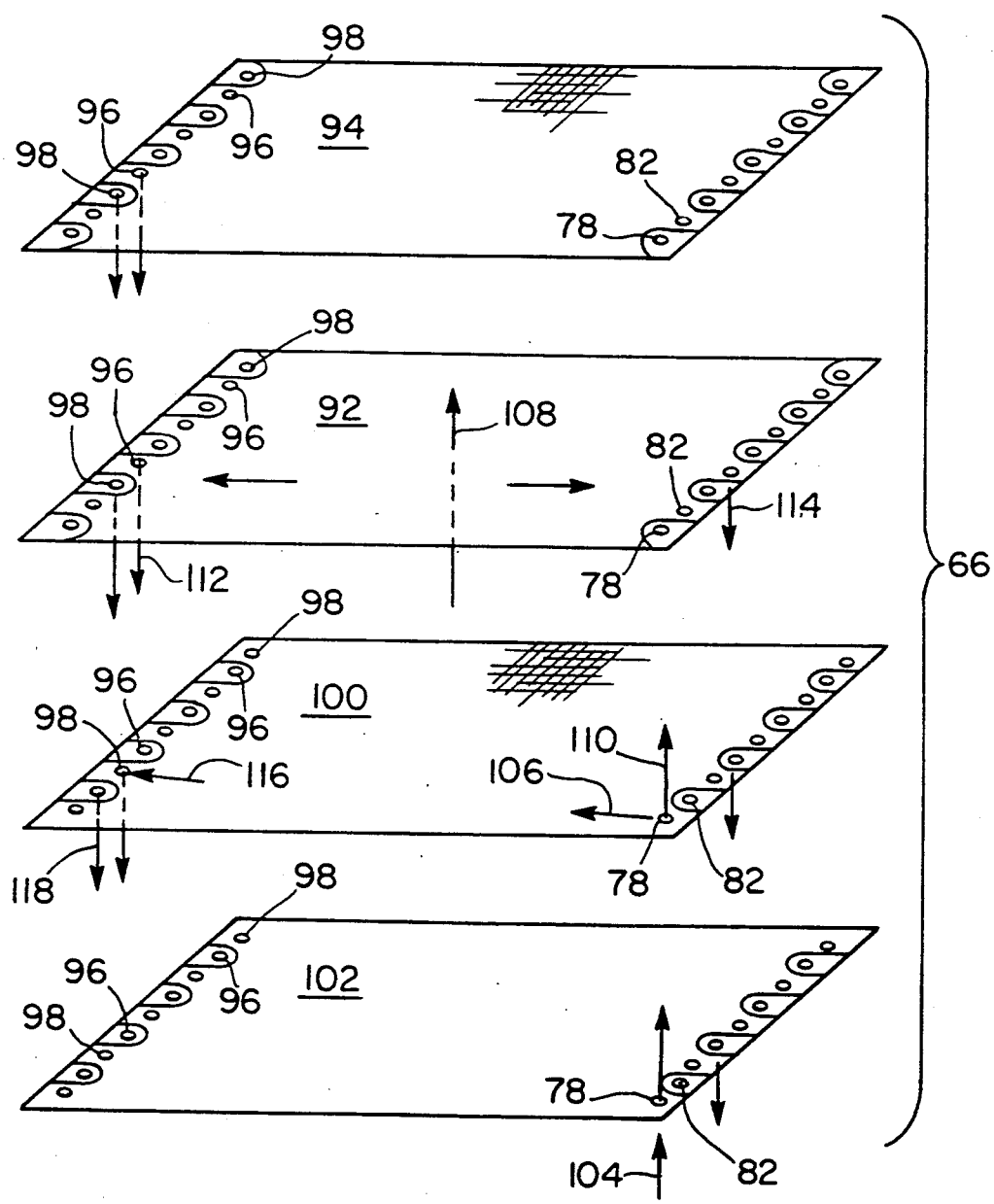
FIG. 4 is an exploded view of a filtration element of this invention.

Referring to FIG. 4, the filtration member 66 includes a filtrate spacer 94, a filter layer 92, a retentate spacer 100 and a liquid impervious layer 102. The incoming liquid represented by arrow 104 passes through hole 78 in layer 102 into spacer 100. A portion of the liquid passes through spacer 100, as represented by arrow 106 and through filter 92 as represented by arrow 108. The remaining portion of the incoming liquid passes upwardly as represented by arrow 110, through holes 78 in filter 92, hole 78 in filtrate spacer 94 and into the next adjacent filtration member (not shown) wherein it proceeds as described above with reference to filtration member 66. The filtrate passes into holes 82 and 96 and passes in a direction as shown by arrows 112 and 114 toward filtrate outlet 74. The retentate passes across retentate spacer 100 as shown by arrow 106 and 116, through holes 98 and to retentate outlet 76 in a direction as shown by arrow 118.

Figure 5:
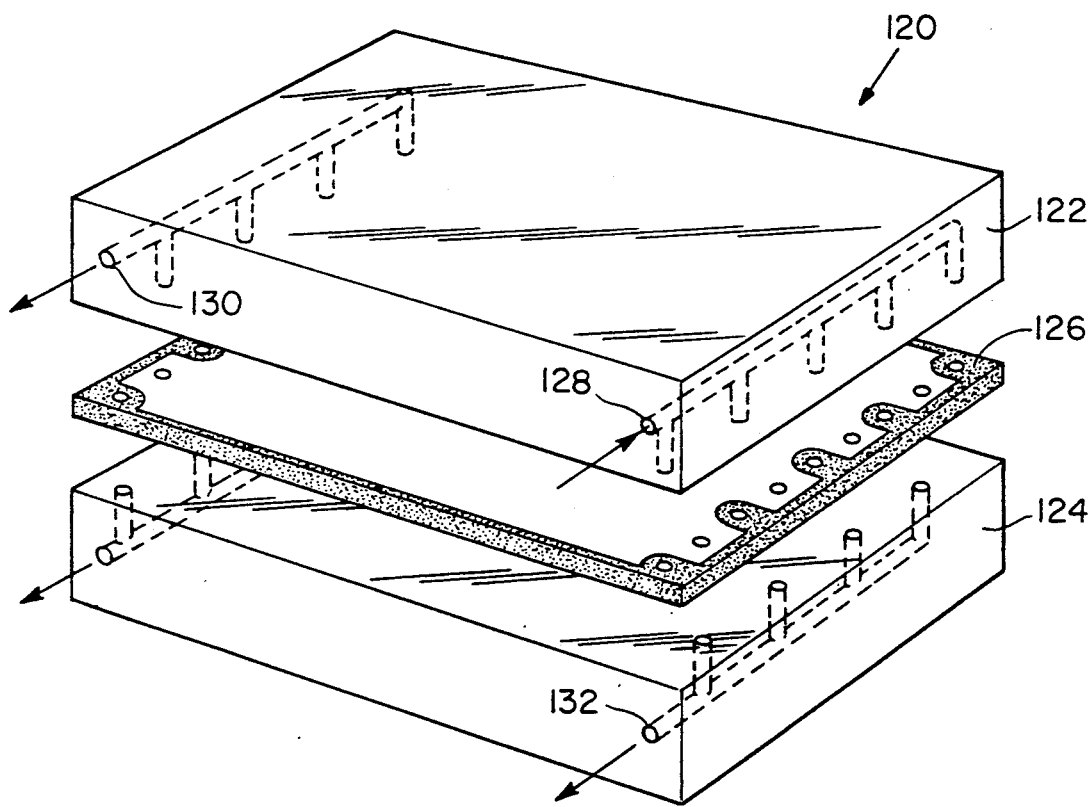
FIG. 5 is an exploded view of a manifold system of the prior art.

Referring to FIG. 5, the filtration apparatus 120 of the prior art is shown. The filtration apparatus 120 includes two manifolds 122 and 124 between which is positioned one or a plurality of filtration elements 126. Manifold 122 includes a liquid inlet 128 and a filtrate outlet 130. Maniford 124 includes a filtrate outlet 132 and a retentate outlet 134.

We claim:

1. A manifold for introducing a liquid feed stream into a filtration member and for removing a filtrate stream and a retentate stream from a filtration member which comprises a plate having an inlet for a liquid feed in fluid communication with a plurality of liquid inlet ports in said plate, said liquid inlet ports being in fluid communication with said filtration member, a retentate outlet from said plate in fluid communication with a plurality of retentate outlet ports in said plate, said retentate outlet ports being in fluid communication with said filtration member, said retentate outlet ports being positioned at a first end of said plate opposite a second end of said plate wherein said feed inlet ports are positioned, a filtrate outlet from said plate in fluid communication with a plurality of filtrate outlet ports in said plate, said filtrate outlet ports being in fluid communication with paths in said plate and being in fluid communication only with filtrate in said filtration member, and said filtrate outlet ports being positioned at said first end and at said second end of said plate.

2. Apparatus for effecting filtration of a liquid feed stream to produce a retentate stream and a filtrate stream which comprises, a) at least one filtration member including means for separating a liquid feed into a retentate stream and a filtrate stream and b) a manifold for introducing a liquid feed stream into said filtration member and for removing a filtrate stream and a retentate stream from said filtration member which comprises a plate having an inlet for a liquid feed in fluid communication with a plurality of liquid inlet ports in said plate, .

said liquid inlet ports being in fluid communication with said filtration member, a retentate outlet from said plate in fluid communication with a plurality of retentate outlet ports in said plate, said retentate outlet ports being in fluid communication with said filtration member, said retentate outlet ports being positioned at a first end of said plate opposite a second end of said plate wherein said feed inlet ports are positioned, a filtrate outlet from said plate in fluid communication with a plurality of filtrate outlet ports in said plate, said filtrate outlet ports being in fluid communication with paths in said plate and being in fluid communication only with filtrate in said filtration member, and said filtrate outlet ports being positioned at said first end and at said second end of said plate.

3. The apparatus of claim 2 wherein said filtration member includes a filter layer comprising a microporous membrane.

4. The apparatus of claim 2 wherein said filtration member includes a filter layer comprising an ultrafiltration membrane.

* * * * *